United States Patent
Zhang et al.

(10) Patent No.: US 12,554,844 B2
(45) Date of Patent: Feb. 17, 2026

(54) METHOD, DEVICE, AND COMPUTER PROGRAM PRODUCT FOR RECOVERING DATA

(71) Applicant: Dell Products L.P., Round Rock, TX (US)

(72) Inventors: Weibing Zhang, Beijing (CN); Lei Gao, Beijing (CN); Chen Gong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 18/618,332

(22) Filed: Mar. 27, 2024

(65) Prior Publication Data

US 2025/0103706 A1 Mar. 27, 2025

(30) Foreign Application Priority Data

Sep. 27, 2023 (CN) .......................... 202311266486.9

(51) Int. Cl.
*G06F 21/55* (2013.01)
*G06F 11/16* (2006.01)

(52) U.S. Cl.
CPC ............ *G06F 21/554* (2013.01); *G06F 11/16* (2013.01); *G06F 2221/034* (2013.01)

(58) Field of Classification Search
CPC ... G06F 21/554; G06F 11/16; G06F 2221/034
See application file for complete search history.

(56) References Cited

U.S. PATENT DOCUMENTS

| | | | |
|---|---|---|---|
| 9,026,499 B1 | 5/2015 | Rajimwale et al. | |
| 9,928,002 B2 | 3/2018 | Kumarasamy et al. | |
| 9,940,460 B1 | 4/2018 | Derbeko et al. | |
| 9,990,253 B1 | 6/2018 | Rajimwale et al. | |
| 10,073,874 B1 * | 9/2018 | Sivathanu | G06F 11/1402 |
| 10,078,459 B1 | 9/2018 | Natanzon et al. | |
| 10,409,986 B1 | 9/2019 | Natanzon et al. | |
| 10,650,146 B1 | 5/2020 | Gaurav et al. | |
| 10,719,307 B2 | 7/2020 | Kanada et al. | |
| 10,742,665 B2 | 8/2020 | Gu et al. | |
| 10,795,994 B2 | 10/2020 | Mehta et al. | |

(Continued)

OTHER PUBLICATIONS

Extended European Search Report for application No. 22175875.8, dated Nov. 17, 2022, 9 pages.

(Continued)

*Primary Examiner* — Christopher A Revak
(74) *Attorney, Agent, or Firm* — BainwoodHuang (57) ABSTRACT

Techniques for recovering data involve, in response to detecting that a data block of a storage system is attacked, determining one or more attacked data blocks, wherein snapshots in multiple snapshots of the storage system have snapshot replicate numbers. Such techniques further involve determining one or more data block replicate numbers of the one or more attacked data blocks. Such techniques further involve identifying the latest target snapshot in the multiple snapshots based on the snapshot replicate numbers of snapshots in the multiple snapshots and the one or more data block replicate numbers, wherein all data blocks in the target snapshot are not attacked. Such techniques further involve recovering data of the storage system based on the latest target snapshot.

20 Claims, 7 Drawing Sheets

(56) References Cited

U.S. PATENT DOCUMENTS

| | | | |
|---|---|---|---|
| 11,086,826 B2 | 8/2021 | Thummala et al. | |
| 11,170,104 B1 | 11/2021 | Stickle et al. | |
| 11,245,420 B2 | 2/2022 | Kim et al. | |
| 11,321,195 B2 | 5/2022 | Dhatrak | |
| 11,663,336 B1 | 5/2023 | Armangau et al. | |
| 11,755,420 B2 * | 9/2023 | Borate | G06F 21/56 714/15 |
| 12,093,391 B2 | 9/2024 | Armangau et al. | |
| 2018/0075234 A1 | 3/2018 | Boutnaru | |
| 2018/0322280 A1 | 11/2018 | Borlick et al. | |
| 2020/0042707 A1 * | 2/2020 | Kucherov | G06F 3/0683 |
| 2020/0226256 A1 | 7/2020 | Gaurav et al. | |
| 2021/0042411 A1 | 2/2021 | Annen et al. | |
| 2021/0336968 A1 * | 10/2021 | Bender | H04L 63/145 |
| 2022/0027472 A1 | 1/2022 | Golden et al. | |
| 2023/0145138 A1 * | 5/2023 | Gee | G06F 21/56 726/24 |
| 2023/0412375 A1 * | 12/2023 | Bisht | G06F 11/1451 |
| 2024/0095358 A1 | 3/2024 | Zhang et al. | |
| 2024/0211598 A1 | 6/2024 | Zhang et al. | |
| 2024/0378321 A1 * | 11/2024 | Nunez Mencias | G06F 16/128 |
| 2025/0036441 A1 * | 1/2025 | Berman | G06F 9/45558 |
| 2025/0036532 A1 * | 1/2025 | Farr | G06F 11/1451 |
| 2025/0036762 A1 * | 1/2025 | Nanivadekar | G06F 21/568 |

OTHER PUBLICATIONS

Zhang, Ming; et al.; "Method, Electronic Device and Computer Program Product for Recovering Data," U.S. Appl. No. 18/615,029, filed Mar. 25, 2024.

* cited by examiner

METHOD, DEVICE, AND COMPUTER PROGRAM PRODUCT FOR RECOVERING DATA

CROSS-REFERENCE TO RELATED APPLICATION

This application claims priority to Chinese Patent Application No. CN202311266486.9, on file at the China National Intellectual Property Administration (CNIPA), having a filing date of Sep. 27, 2023, and having "METHOD, APPARATUS AND COMPUTER PROGRAM PRODUCT FOR RECOVERING DATA" as a title, the contents and teachings of which are herein incorporated by reference in their entirety.

TECHNICAL FIELD

Embodiments of the present disclosure generally relate to the field of computers, and more specifically to a method, a device, and a computer program product for recovering data.

BACKGROUND

The field of computer storage is a crucial field in computer science and information technology and relates to technologies and methods for storing, managing, and retrieving data. The development of the storage field also relates to challenges in data compression, backup, and recovery, data security, big data processing, and other aspects. In modern computer systems, the selection and management of storage technologies are crucial for ensuring data availability and performance.

The snapshot technology is an important technology widely used in the field of computer storage. It allows capturing a replicate of data at a certain time without interrupting a running system or application. These replicates of data are called snapshots and are typically used for backup, recovery, version control, and data analysis purposes. The snapshot technology records a state of a file system or storage volume at a specific time point and provides flexibility and recoverability, helping to improve the availability and reliability of a storage system.

SUMMARY OF THE INVENTION

Embodiments of the present disclosure provide a method, a device, and a computer program product for recovering data.

In an aspect of the present disclosure, a method for recovering data is provided. The method includes in response to detecting that a data block of a storage system is attacked, determining one or more attacked data blocks, where snapshots in multiple snapshots of the storage system have snapshot replicate numbers. The method further includes determining one or more data block replicate numbers of the one or more attacked data blocks. The method further includes identifying the latest target snapshot in the multiple snapshots based on the snapshot replicate numbers of snapshots in the multiple snapshots and the one or more data block replicate numbers, where all data blocks in the target snapshot are not attacked. In addition, the method further includes recovering data of the storage system based on the latest target snapshot.

In another aspect of the present disclosure, an electronic device is provided. The device includes a processing unit and a memory, wherein the memory is coupled to the processing unit and stores instructions. The instructions, when executed by the processing unit, perform the following actions: in response to detecting that a data block of a storage system is attacked, determining one or more attacked data blocks, wherein snapshots in multiple snapshots of the storage system have snapshot replicate numbers; determining one or more data block replicate numbers of the one or more attacked data blocks; identifying the latest target snapshot in the multiple snapshots based on the snapshot replicate numbers of snapshots in the multiple snapshots and the one or more data block replicate numbers, wherein all data blocks in the target snapshot are not attacked; and recovering data of the storage system based on the latest target snapshot.

In still another aspect of the present disclosure, a computer program product is provided. The computer program product is tangibly stored on a non-transitory computer-readable medium and contains computer-executable instructions. The computer-executable instructions, when executed, cause a computer to perform the method or process according to the embodiments of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the embodiments of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

Usually, data attacks pose a significant threat to user data security, and data storage servers are often the targets of attacks. Scheduling snapshots is a great way to protect data, and users can choose one snapshot to restore a storage system to its previous state before an attack. However, due to the fact that data attacks are not easily detected by the storage system, there may be many damaged snapshots when an attack is detected. A conventional method requires manual rollback and checking of each snapshot. Due to the existence of many snapshots, it is very time-consuming to mount the snapshots sequentially according to their generation time for check. During manual inspections, users are unable to access raw data, which will have a significant adverse impact on their business.

Performance is also an issue, and there are usually multiple storage objects in a storage server. Sometimes only some objects are affected by middleware attacks, and unaffected objects still need to work normally. However, scanning and checking attacked data blocks involves reading a large amount of data from the system, which will affect system performance and slow down normal IOs, which especially brings poor user experience in a multi-tenant environment, where when a tenant is attacked by malware, all other tenants will be affected during the scanning process.

Regarding this, embodiments of the present disclosure provide a method for recovering data. The method includes firstly acquiring, when data blocks in a storage system are found to be attacked, data block replicate numbers of the attacked data blocks. Then, by using the replicate numbers of multiple snapshots of the storage system and the data block replicate numbers, the latest clean snapshot that has not been attacked in the storage system is obtained. Then, the latest clean snapshot is used to recover data of the storage system. The method provided by the embodiments of the present disclosure helps users quickly determine the latest clean snapshot with a small number of manual inspections, in order to quickly recover from detected attacks.

The basic principles and some example implementations of the present disclosure are illustrated below with reference to FIG. 1 to FIG. 6. It should be understood that these example embodiments are given only to enable those skilled in the art to better understand and thus implement the embodiments of the present disclosure, and are not intended to limit the scope of the present disclosure in any way.

Figure 1:
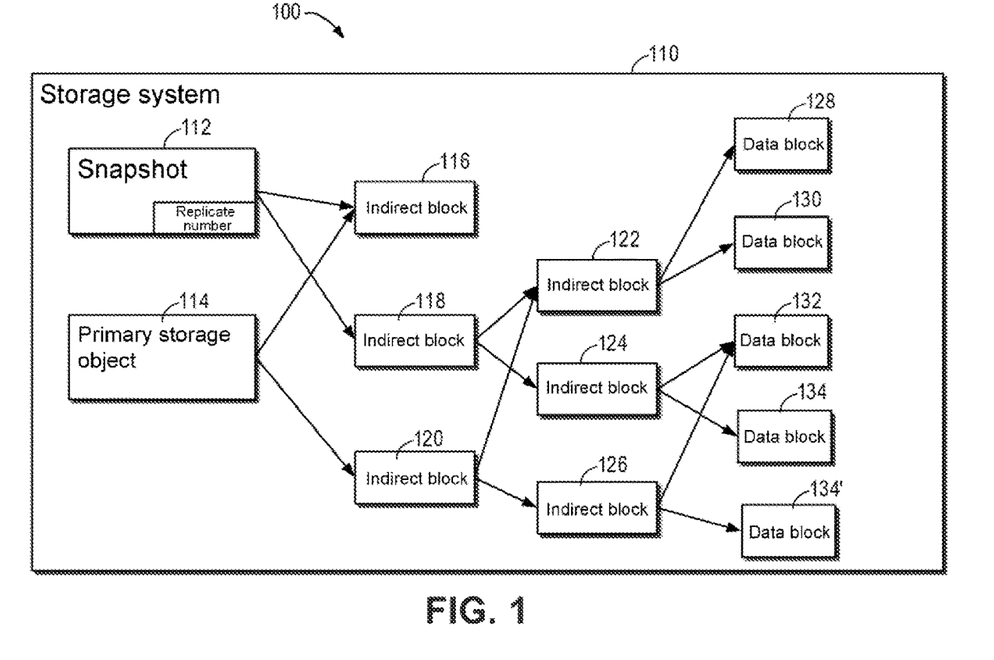
FIG. 1 shows a schematic diagram of an example environment of a storage system according to the embodiments of the present disclosure.

FIG. 1 shows a schematic diagram of an example environment 100 of a storage system according to the embodiments of the present disclosure. As shown in FIG. 1, a storage system 110 includes a snapshot 112 and a primary storage object 114. It should be understood that the storage system 110 often includes a large number of snapshots, and the example environment 100 showing one snapshot is for illustrative purposes only. The primary storage object 114 is a currently working storage object in the storage system 110. By creating a snapshot of the primary storage object 114 at a certain time, a corresponding snapshot can be obtained. The storage system 110 further includes indirect blocks 116 to 126, and these indirect blocks do not store data and are used to help the snapshot 112 or the primary storage object 114 index to a position of a data block. The snapshot 112 is a group of reference marks of data at a specific time point. For example, the snapshot 112 is reference marks of a data block 128, a data block 130, a data block 132, and a data block 134. The snapshot 112 functions like a detailed content table, providing users with accessible replicates of data that can be rolled back, reducing the threat of data attacks. For example, if a user's storage service receives encryption attacks from ransomware or malware but has a clean snapshot that is not affected by these encryptions, it can be rolled back to a clean version to eliminate and reduce the threat of encryption attacks.

In some embodiments, the storage system 110 uses redirect-on-write (ROW) for new write request operations on the snapshot 112 of the primary storage object 114. When a new write request arrives at the primary storage object 114, the data will be written to a new data block, and the original data to be used by the snapshot 112 is marked. For example, when subjected to data encryption attacks, for the primary storage object 114 being served, the original data block 134 will be replaced by the encrypted data block 134', and then it will be saved in a next snapshot.

In some embodiments, the storage system 110 is scheduled to automatically generate snapshots at a specific time or frequency, which helps to utilize an automatic snapshot scheduling strategy to protect data. For example, in some embodiments, a snapshot program can be scheduled once an hour, i.e., generating a new snapshot every hour; in some embodiments, the snapshot program can be scheduled once a day, i.e., generating a new snapshot every day; in some embodiments, the snapshot program can be scheduled once a week, i.e., generating a new snapshot every week. It should be understood that the snapshot scheduling strategy can be determined by users, depending on features and importance of data in the storage system, which is not limited in the present disclosure.

In some embodiments, when files and folders are replaced with encrypted content, if an attack cannot be detected timely, an encrypted data block will be taken to the next snapshot. When an attack is detected, due to the need to roll back to a non-attacked state, it is necessary to find the latest clean snapshot from multiple snapshots, but usually there are already many attacked data blocks and files in the storage system 110 at this time. Users often find it difficult to choose the latest clean snapshot. If the selected snapshot still contains an attacked data block, the recovery will fail; if the selected snapshot is too old, many recent data blocks may not be recovered as expected.

Still referring to FIG. 1, the snapshot 112 includes a replicate number for marking a version of the snapshot. In addition, the data block 128, the data block 130, the data block 132, the data block 134, and the data block 134' all have data block replicate numbers to mark in which version the data block was changed. It should be understood that the replicate number of a data block can be stored together with the data block or stored in other locations, which is not limited in the present disclosure. In some embodiments, if the data block 134' in the primary storage object 114 being served is attacked, then a snapshot of the storage system 110 generated at the next moment will have the attacked data block 134', which is not a clean snapshot.

Figure 2:
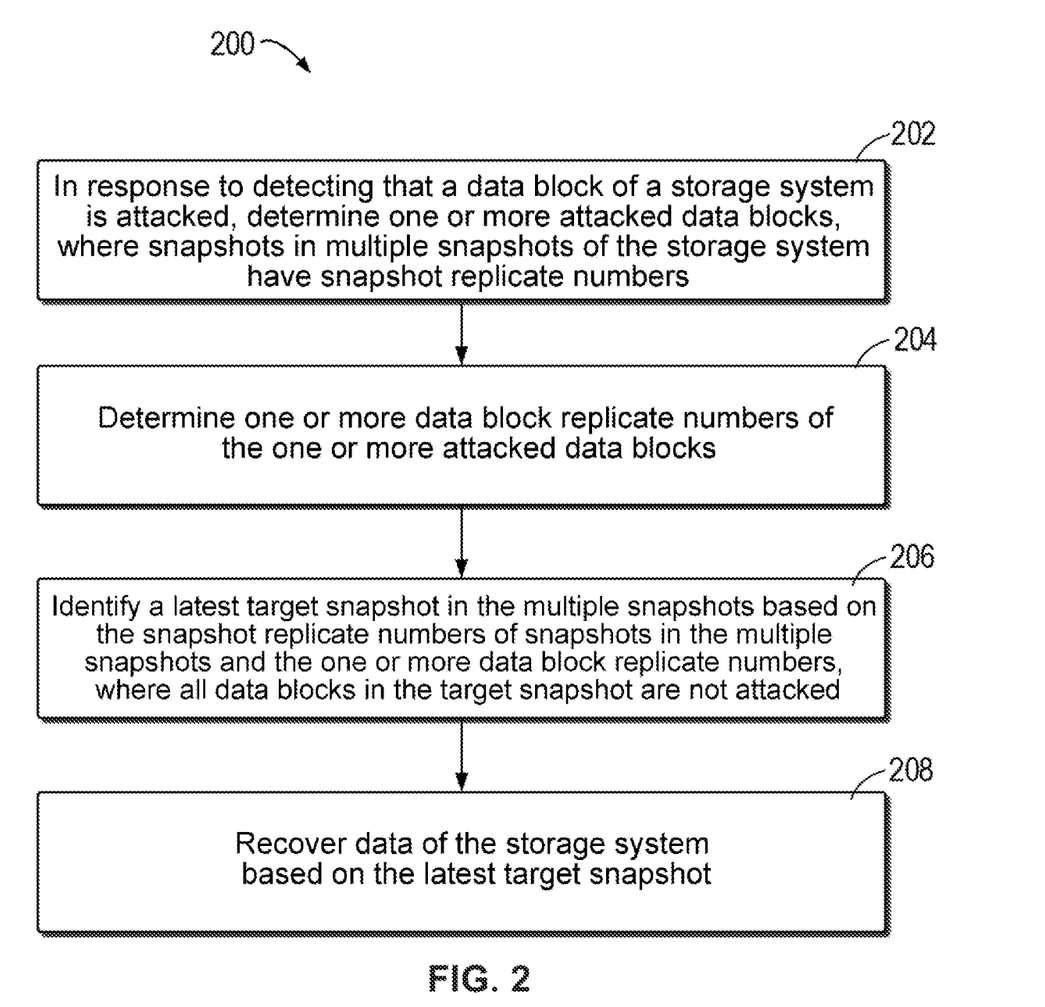
FIG. 2 shows a flow chart of a method for recovering data according to the present disclosure.

FIG. 2 shows a flow chart of a method 200 for recovering data according to the present disclosure. At a block 202, in response to detecting that a data block of a storage system is attacked, one or more attacked data blocks are determined, where snapshots in multiple snapshots of the storage system have snapshot replicate numbers. For example, when it is detected that a data block in the storage system is being attacked, the attack has often been ongoing for a period of time, and even the attacker (such as the developer of ransomware) informs the storage system that the storage system has been attacked. Therefore, when detecting an attack on data blocks in the storage system, it is necessary to first determine one or more attacked data blocks to acquire some information about the attacked data blocks.

At a block 204, one or more data block replicate numbers of the one or more attacked data blocks are determined. For example, the one or more attacked data blocks are determined at 202, and some information about the attacked data blocks can be acquired, so as to determine one or more data block replicate numbers of the one or more attacked data blocks.

At a block 206, the latest target snapshot in the multiple snapshots is identified based on the snapshot replicate numbers of snapshots in the multiple snapshots and the one or more data block replicate numbers, where all data blocks in the target snapshot are not attacked. For example, the latest target snapshot (i.e., a clean snapshot) is determined from multiple snapshots in the system by means of the snapshot replicate numbers and the data block replicate numbers. In addition, at a block 208, data of the storage system is recovered based on the latest target snapshot. For example, by means of the latest clean snapshot, the storage system is recovered to a state consistent with the latest clean snapshot.

By means of the method 200 provided by the embodiments of the present disclosure, snapshot replicate numbers and data block replicate numbers can be used to obtain the latest clean snapshot that is not attacked in a storage system; then the latest clean snapshot is used to recover data of the storage system, which helps users quickly determine the latest clean snapshot with a small number of manual inspections, so as to quickly recover from detected attacks.

Figure 3A:
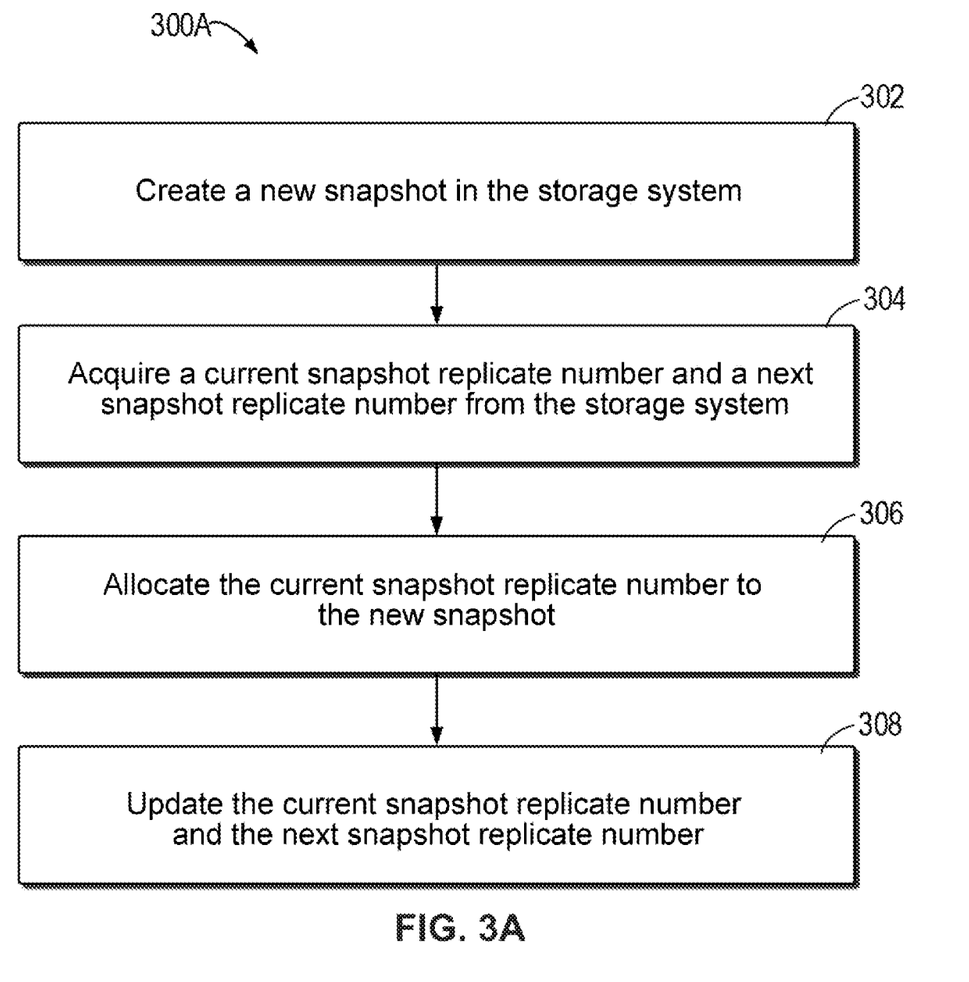
FIG. 3A shows a flow chart of a method for updating snapshot replicate numbers of snapshots according to the embodiments of the present disclosure.

FIG. 3A shows a flow chart of a method 300A for updating snapshot replicate numbers of snapshots according to the embodiments of the present disclosure. As shown in FIG. 3, at a block 302, a snapshot is created in a system. The storage system can be scheduled to automatically generate snapshots at a specific time or frequency, so new snapshots are often generated in the storage system, which helps to utilize an automatic snapshot scheduling strategy to protect data.

At a block 304, a current snapshot replicate number and a next snapshot replicate number are obtained from the storage system. For example, the current snapshot replicate number and the next snapshot replicate number can be restored in a data block at a certain location of the storage system for facilitating acquisition when needed. In some embodiments, the current snapshot replicate number and the next snapshot replicate number are stored in a superblock of a file system. Superblock is the most basic metadata of a file system and defines the similarity, size, state, and information (metadata of the metadata) about other metadata structures of the file system. In addition, due to the fact that the superblock is very crucial to the file system, redundancy storage is performed, and then the current snapshot replicate number and the next snapshot replicate number will correspondingly be redundantly stored, which improves the reliability.

At a block 306, the current snapshot replicate number is allocated to the new snapshot. For example, when the new snapshot is attacked, the current snapshot replicate number acquired at 304 is allocated to the new snapshot, then in the storage system, the new snapshot will have the snapshot replicate number. The current snapshot number is X, then the snapshot replicate number of the new snapshot is also X. At a block 308, the current snapshot replicate number and the next snapshot replicate number are updated. In some embodiments, the updating operation can be using the next snapshot replicate number as the current snapshot replicate number and increasing the next snapshot replicate number progressively as a new next snapshot replicate number. For example, the current snapshot replicate number is X and the next snapshot replicate number is X+1, then after updating, the current snapshot replicate number is X+1 and the next snapshot replicate number is X+2.

In view of this, by means of the method 300A of the embodiments of the present disclosure, snapshot replicate numbers can be allocated to newly created snapshots, and snapshot replicate numbers are updated, so as to ensure that when the method 200 according to FIG. 2 is performed, each snapshot in multiple snapshots of the storage system has its respective snapshot replicate number.

Figure 3B:
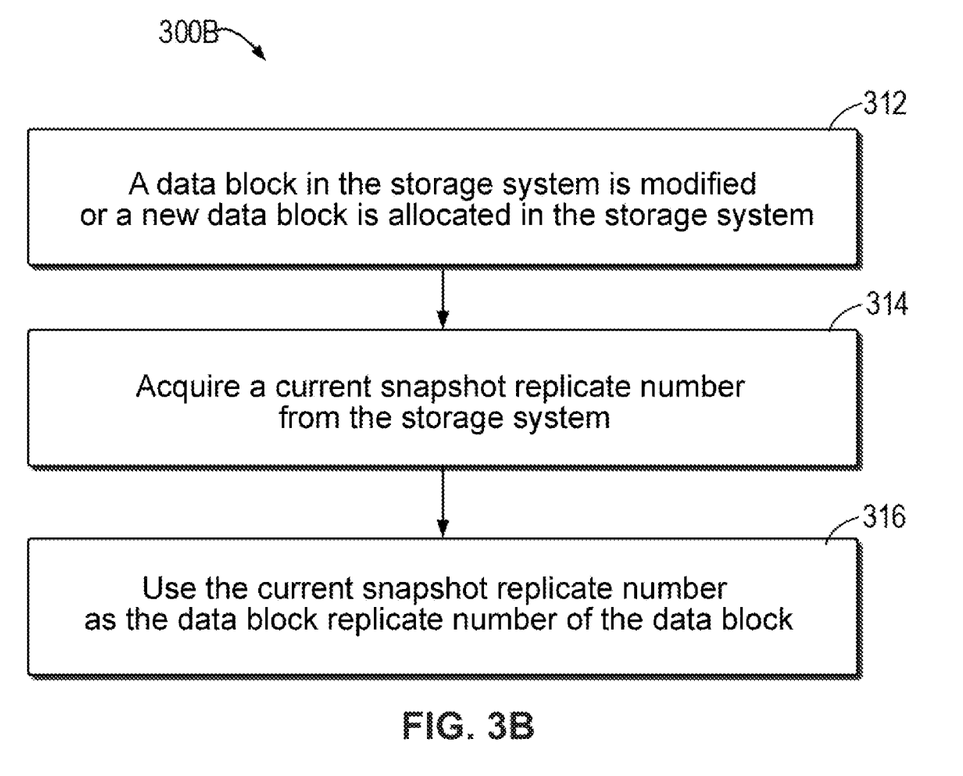
FIG. 3B shows a flow chart of a method for updating data block replicate numbers of data blocks according to the embodiments of the present disclosure.

FIG. 3B shows a flow chart of a method 300B for updating data block replicate numbers of data blocks according to the embodiments of the present disclosure. At a block 312, data blocks in a storage system are written or new data blocks are allocated in the storage system. In some embodiments, when a data block in the storage system is modified (for example, subjected to a write operation or an encryption attack), the data block replicate number of the data block needs to be updated. In addition, in some embodiments, when a new data block is allocated in the storage system, the new data block also needs to be endowed with a data block replicate number.

At a block 314, a current snapshot replicate number is acquired from the storage system. For example, as stated in FIG. 3A, the current snapshot replicate number can be acquired from a superblock. At a block 316, the current snapshot replicate number can be used as the data block replicate number of a data block. For example, if the current snapshot replicate number is X, then the data block replicate number of the data block is also X. In addition, it should be understood that after the snapshot replicate number of a snapshot is determined, it will not change; however, after the data block replicate number of a data block is determined, if the data block itself changes, its data block replicate number may also change.

In view of this, by means of the method 300B of the embodiments of the present disclosure, a data block replicate number can be determined and updated for each data block in the storage system, so as to ensure that when the method 200 according to FIG. 2 is performed, multiple data blocks in the storage system have their respective data block replicate numbers.

Figure 4:
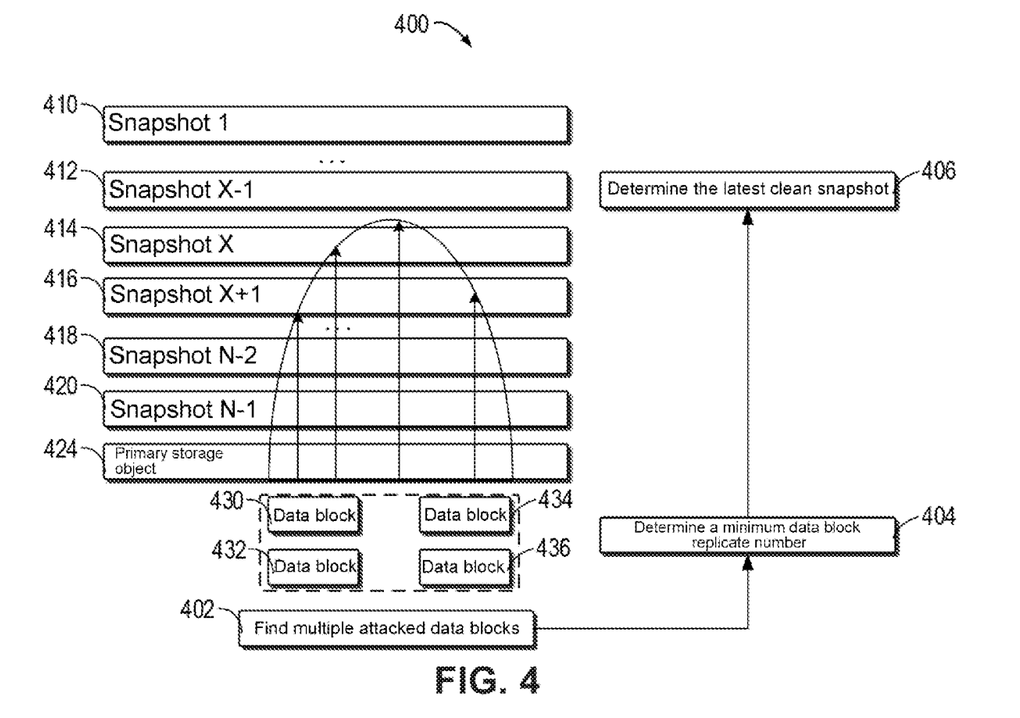
FIG. 4 shows a schematic diagram of a process for determining the latest clean snapshot according to the embodiments of the present disclosure.

FIG. 4 shows a schematic diagram of a process 400 for determining the latest clean snapshot according to the embodiments of the present disclosure. As shown in FIG. 4, at a block 402, multiple attacked data blocks can be found. For example, attacked data blocks are detected in a primary storage object 424, then all data blocks in the primary storage object 424 can be scanned and detected to find one or more attacked data blocks. As shown in FIG. 4, a data block 430, a data block 432, a data block 434, and a data block 436 in a dotted-line block are attacked data blocks. For example, attacks on data in the storage system may lead to new file encryption, in-place file encryption, file deletion, movement of files to encrypted compressed files, etc. It should be understood that the four data blocks shown here are for illustrative purposes, and there are often many attacked data blocks in practice.

At a block 404, a minimum data block replicate number in the one or more attacked data blocks can be determined. For example, the data block replicate number of the data block 430 may be N−2, the data block replicate number of the data block 432 may be N−1, the data block replicate number of the data block 434 may be X+1, and the data block replicate number of the data block 436 may be X. According to an arrangement order of a snapshot 410 (whose replicate number is 1) to a snapshot 424 (whose replicate number is N−2), it can be determined that the replicate number X of the data block 436 is the minimum data block replicate number.

In some embodiments, file system block numbers (FSBN) of multiple attacked data blocks can be collected by means of block mapping. For example, when it is found that a file with an index node (inode) 9424 is an encryption-attacked file, the following blk_mapping.pl can be utilized to find the underlying FSBN:

```
blk_mapping.pl --mode downward --fsid 536870920 --inode 9424 --offset 0
INFO: Please wait while mapping is ongoing... (details in blk_mapping.log)
[UDFS] fsid=536870920(0x20000008), inode=9424(0x24D0), block_offset_in_file=0
[UDSV] fsid=536870920(0x20000008), fsbn=4294968270(0x1000003CE),
slice=131072(0x20000), block_offset_in_slice=974(0x3CE), qos=0(0)
[LDFS] fsid=1073741831(0x40000007), inode=9441(0x24E1),
block_offset_in_file=66510(0x103CE)
[LDSV] fsid=1073741831(0x40000007), fsbn=1537598656128(0x16600058E80),
slice=46923787(0x2CC000B), block_offset_in_slice=3712(0xE80), qos=1(1)
[FLU] flu_id=1, mlu_device_id=2, sector_offset_in_flu=86173696(0x522E800)
```

In addition, regarding the LUN, the attacked data blocks can be observed from an application layer, then mapping is performed to find FSBNs of these blocks.

In some embodiments, each data block can be extended using an external block metadata object (BMD), which records certain states about the data block. Changing the content of the data block will cause its BMD to be updated to reflect the change, as shown in the update process of the data block replicate number of the data block in FIG. 3B. In some embodiments, versionSetId (version number) and replicaId (replicate number) in the BMD can be utilized to track allocation and/or writing of the data block. For example, versionSetId can be used to determine an owner of a data block. For example, the data block belongs to the product department, development department, or testing department; and replicaId is the data block replicate number of the data block.

In some embodiments, when a block is allocated and/or written, the current replicaId and versionSetId will be set into the BMD entries of the data block, then the FSBN can be utilized to obtain a BMD result:

```
fs_db64.exe readbmd 40000007 0x16600058E80
--- Block Meta Data(v2) @ Sector 0x146000091130(22402550010160) ---
state=16
bitmap=1
icrc=bfbd36bb
crc=0
owner=9441
offset=86173696
totalWeight=131071
replicaId=15
versionSetId=1
gen=32768
blockgen=0
seqnum=1
```

In some embodiments, BMD cannot be directly accessed at present; however, a new API interface can be developed to provide block mapping and BMD information query in a data path, so as to accelerate the mapping and query process, especially for batch mapping and query of encrypted file clusters and block ranges.

Still referring to FIG. 4, at a block 406, the latest clean snapshot can be determined. For example, it can be determined at 404 that the minimum data block replicate number is X, then it means that a snapshot affected by the first attack is a snapshot 414 (whose snapshot replicate number is X), then it can be directly determined that the latest clean snapshot is a snapshot 412 (whose snapshot replicate number is X−1).

Therefore, by means of the method 400 of the embodiments of the present disclosure, the latest clean snapshot can be quickly positioned by means of the minimum data block replicate number in multiple attacked data blocks, so that users do not need to manually load multiple snapshots to determine the latest clean snapshot one by one, thereby saving time and improving efficiency.

In some embodiments, there may be a large number of attacked data blocks; in this case, sampling can be performed on the multiple attacked data blocks, then the minimum data block replicate number in the sampled data blocks and the latest clean snapshot can be confirmed, thereby further improving data recovery efficiency.

In some embodiments, there may be a large number of attacked data blocks; however, the minimum data block replicate number is determined by confirming important data blocks in the attacked data blocks, so as to determine the latest "clean" snapshot. It means that there may be attacked data blocks in the latest "clean" snapshot found. However, since these data blocks are not important, for example, some unimportant log data is encrypted, they may not be recovered.

In some embodiments, it may be discovered that all data blocks in the snapshots are attacked after going through the process 400; in this case, data in the storage system cannot be recovered by using snapshots, and it may be necessary to use a backup storage system for recovery. Nevertheless, by means of the embodiments of the present disclosure, it is still possible to quickly locate the first snapshot among all snapshots that has been attacked, avoiding the discovery after all snapshots are loaded and saving the analysis time.

Figure 5:
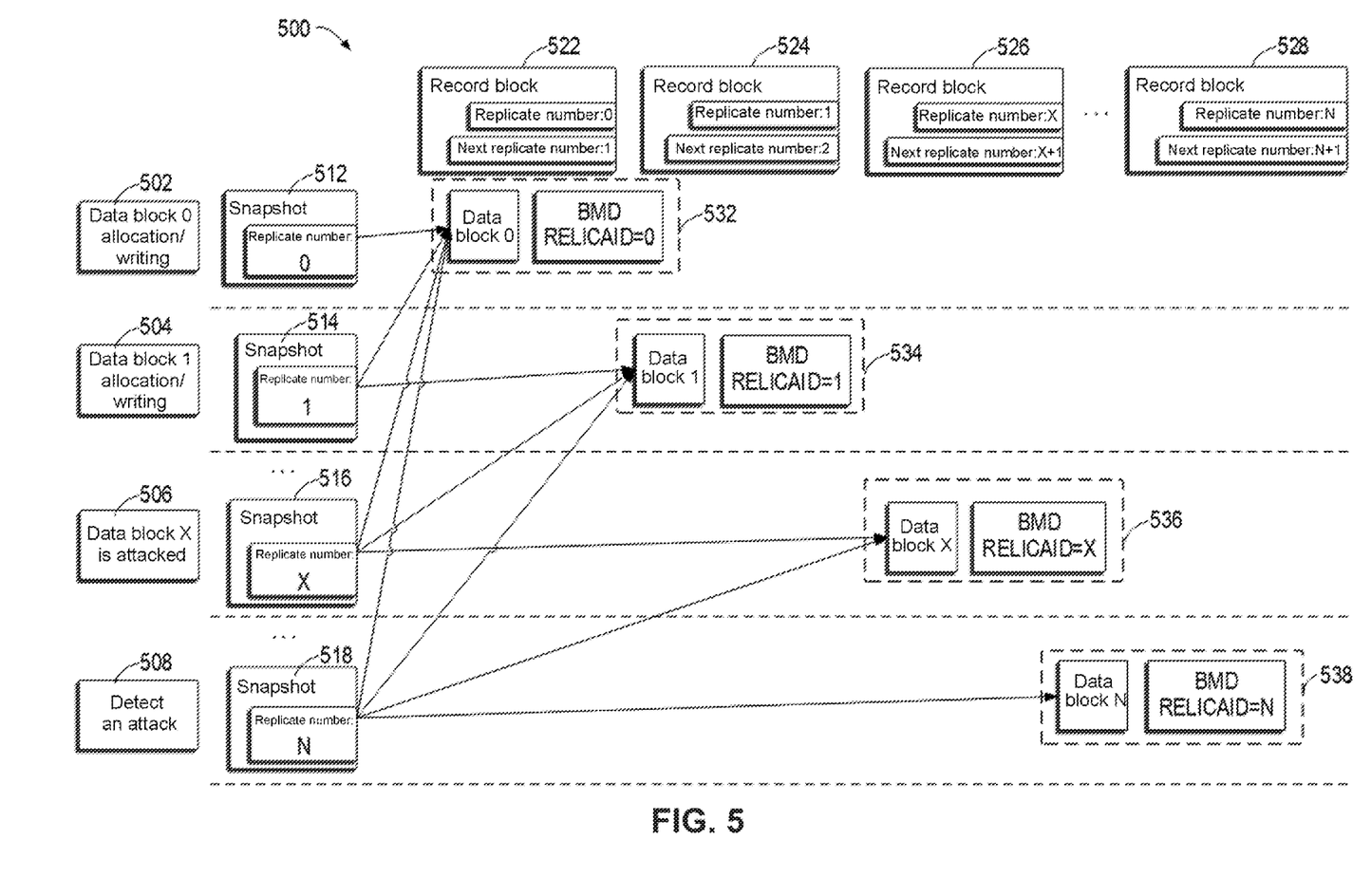
FIG. 5 shows a schematic diagram of another process for determining the latest clean snapshot according to the embodiments of the present disclosure.

FIG. 5 shows a schematic diagram of another process 500 for determining the latest clean snapshot according to the embodiments of the present disclosure. At a block 502, a data block 0 is allocated/or written. For example, when the data block 0 does not exist in a storage system, it can be an allocation process; when the data block 0 exists in a storage system, it can be a writing process. In some embodiments, a replicate number in a record block 522 can be allocated to the data block 0, for example, a replicaId field written into the BMD of a block 532, i.e., replicaId=0. In addition, when a snapshot 512 is generated, a replicate number in the record block 522 can also be allocated to the replicate number of the snapshot 512. As stated above, the record block 522, record block 524, record block 526, and record block 528 here can be superblocks in a file system for managing replicate numbers and the next replicate numbers of the storage system.

At a block 504, a data block 1 is allocated/or written. In this phase, the replicate number and the next replicate number in the record block 524 are obtained by updating the replicate number and the next replicate number of the record block 522. For example, the replicate number of the record block 524 can be used as the next replicate number of the record block 522, and the next replicate number of the record block 524 can be used as an auto-increment of the next replicate number of the record block 522. Similarly, the replicate number of the snapshot 514 is the same as the replicate number of the record block 524, and the replicaId field of the BMD of the data block 1 in a block 534 is also the same as the replicate number of the block 524.

At a block 506, a data block X is attacked. In some embodiments, a data block in the storage system is attacked for the first time, but it is often difficult to detect at this time. The replicate number of the snapshot 516 and the data block replicate number of the data block X in the block 536 are still updated.

At a block 508, an attack is detected. At this time, a snapshot replicate number of a snapshot 518 is N, and a data block replicate number of the data block N in a block 538 is also N. As stated above, at this time, the primary storage object in the current storage system will be scanned to determine multiple attacked data blocks and corresponding data block replicate numbers and find the minimum data block replicate number. Finally, the data block X that is attacked for the first time will be found, so as to determine that the cleanest snapshot is a snapshot having a replicate number of X-1 that is the same as the replicate number of the block 524.

Figure 6:
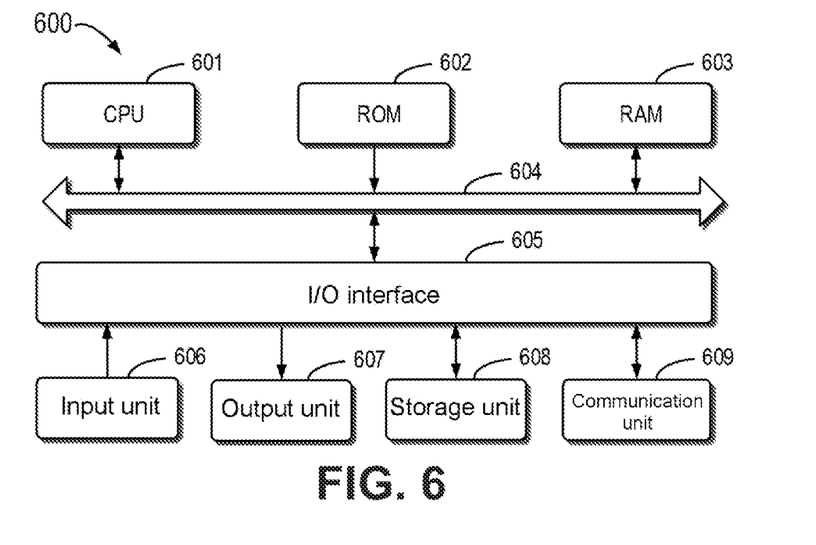
FIG. 6 shows a schematic block diagram of a device that can be used to implement the embodiments of the present disclosure.

FIG. 6 illustrates a schematic block diagram of a device 600 that may be used to implement an embodiment of the present disclosure. The device 600 may be a device or an apparatus as described in embodiments of the present disclosure. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; the storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various methods or processes described above may be performed by the processing unit 601. For example, in some embodiments, the methods can be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded onto the RAM 603 and executed by the CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method for recovering data, comprising:
   in response to detecting that a data block of a storage system is attacked, determining one or more attacked data blocks, wherein snapshots in multiple snapshots of the storage system have snapshot replicate numbers;
   determining one or more data block replicate numbers of the one or more attacked data blocks;
   identifying the latest target snapshot in the multiple snapshots based on the snapshot replicate numbers of snapshots in the multiple snapshots and the one or more data block replicate numbers, wherein all data blocks in the target snapshot are not attacked;
   recovering data of the storage system based on the latest target snapshot; and
   in response to creating a new snapshot in the storage system:
   acquiring a current snapshot replicate number and a next snapshot replicate number from the storage system;
   allocating the current snapshot replicate number to the new snapshot; and
   updating the current snapshot replicate number and the next snapshot replicate number.

2. The method according to claim 1, wherein identifying the latest target snapshot in the multiple snapshots comprises:
   determining a minimum data block replicate number in the one or more data block replicate numbers; and
   identifying the latest target snapshot in the multiple snapshots based on the minimum data block replicate number.

3. The method according to claim 1, wherein updating the current snapshot replicate number and the next snapshot replicate number comprises:
  using the next snapshot replicate number as the current snapshot replicate number; and
  increasing the next snapshot replicate number progressively as the new next snapshot replicate number.

4. The method according to claim 1, further comprising:
  in response to that a data block in the storage system is modified:
    acquiring another snapshot replicate number from the storage system; and
    using the other snapshot replicate number as the data block replicate number of the data block.

5. The method according to claim 4, further comprising:
  in response to allocating a new data block in the storage system:
    acquiring the other snapshot replicate number from the storage system; and
    using the other snapshot replicate number as the data block replicate number of the new data block.

6. The method according to claim 5, wherein recovering data of the storage system comprises:
  recovering the storage system to a state corresponding the latest target snapshot by mounting the latest target snapshot.

7. The method according to claim 1, wherein determining the one or more data block replicate numbers of the one or more attacked data blocks comprises:
  collecting one or more file system numbers of the one or more attacked data blocks;
  determining, based on the one or more file system numbers, one or more file system entries of the one or more attacked data blocks; and
  determining the one or more data block replicate numbers based on the one or more file system entries.

8. The method according to claim 7, wherein determining the one or more attacked data blocks further comprises:
  in response to determining that the quantity of attacked data blocks is greater than a predetermined threshold, sampling the attacked data blocks; and
  using the sampled attacked data blocks as the one or more attacked data blocks.

9. The method according to claim 8, wherein identifying the latest target snapshot in the multiple snapshots comprises:
  if the snapshot replicate number of a snapshot in the multiple snapshots is greater than or equal to each data block replicate number in the one or more data block replicate numbers, determining that the storage system does not have the latest target snapshot.

10. An electronic device, comprising:
  a processing unit; and
  a memory coupled to the processing unit and storing instructions, wherein the instructions, when executed by the processing unit, perform the following actions:
    in response to detecting that a data block of a storage system is attacked, determining one or more attacked data blocks, wherein snapshots in multiple snapshots of the storage system have snapshot replicate numbers;
    determining one or more data block replicate numbers of the one or more attacked data blocks;
    identifying the latest target snapshot in the multiple snapshots based on the snapshot replicate numbers of snapshots in the multiple snapshots and the one or more data block replicate numbers, wherein all data blocks in the target snapshot are not attacked;
    recovering data of the storage system based on the latest target snapshot;
    in response to creating a new snapshot in the storage system:
      acquiring a current snapshot replicate number and a next snapshot replicate number from the storage system;
      allocating the current snapshot replicate number to the new snapshot; and
      updating the current snapshot replicate number and the next snapshot replicate number.

11. The electronic device according to claim 10, wherein identifying the latest target snapshot in the multiple snapshots comprises:
  determining a minimum data block replicate number in the one or more data block replicate numbers; and
  identifying the latest target snapshot in the multiple snapshots based on the minimum data block replicate number.

12. The electronic device according to claim 10, wherein updating the current snapshot replicate number and the next snapshot replicate number comprises:
  using the next snapshot replicate number as the current snapshot replicate number; and
  increasing the next snapshot replicate number progressively as the new next snapshot replicate number.

13. The electronic device according to claim 10, further comprising:
  in response to that a data block in the storage system is modified:
    acquiring another snapshot replicate number from the storage system; and
    using the other snapshot replicate number as the data block replicate number of the data block.

14. The electronic device according to claim 13, further comprising:
  in response to allocating a new data block in the storage system:
    acquiring the other snapshot replicate number from the storage system; and
    using the other snapshot replicate number as the data block replicate number of the new data block.

15. The electronic device according to claim 14, wherein recovering data of the storage system comprises:
  recovering the storage system to a state corresponding the latest target snapshot by mounting the latest target snapshot.

16. The electronic device according to claim 10, wherein determining the one or more data block replicate numbers of the one or more attacked data blocks comprises:
  collecting one or more file system numbers of the one or more attacked data blocks;
  determining, based on the one or more file system numbers, one or more file system entries of the one or more attacked data blocks; and
  determining the one or more data block replicate numbers based on the one or more file system entries.

17. The electronic device according to claim 16, wherein determining the one or more attacked data blocks further comprises:
  in response to determining that the quantity of attacked data blocks is greater than a predetermined threshold, sampling the attacked data blocks; and
  using the sampled attacked data blocks as the one or more attacked data blocks.

18. A computer program product, wherein the computer program product is tangibly stored on a non-volatile computer-readable medium and comprises machine-executable instructions, and the machine-executable instructions, when executed, cause a machine to perform the following actions:
   in response to detecting that a data block of a storage system is attacked, determining one or more attacked data blocks, wherein snapshots in multiple snapshots of the storage system have snapshot replicate numbers;
   determining one or more data block replicate numbers of the one or more attacked data blocks;
   identifying the latest target snapshot in the multiple snapshots based on the snapshot replicate numbers of snapshots in the multiple snapshots and the one or more data block replicate numbers, wherein all data blocks in the target snapshot are not attacked;
   recovering data of the storage system based on the latest target snapshot; and
   in response to that a data block in the storage system is modified:
      acquiring a current snapshot replicate number from the storage system; and
      using the current snapshot replicate number as the data block replicate number of the data block.

19. The computer program product according to claim 18, wherein the actions further comprise:
   in response to allocating a new data block in the storage system:
      acquiring the current snapshot replicate number from the storage system; and
      using the current snapshot replicate number as the data block replicate number of the new data block.

20. The computer program product according to claim 18, wherein recovering data of the storage system comprises:
   recovering the storage system to a state corresponding the latest target snapshot by mounting the latest target snapshot.

* * * * *